United States Patent
Grevener et al.

(10) Patent No.: US 9,434,432 B2
(45) Date of Patent: Sep. 6, 2016

(54) METHOD FOR FITTING MOTOR VEHICLE SUSPENSION SYSTEMS

(75) Inventors: Christoph Grevener, Gechingen (DE); Uwe Habisreitinger, Freudenstadt (DE); Andreas Krevet, Ehningen (DE); Matthias Mueller, Altensteig (DE); Thomas Stark, Tuebingen (DE); Konrad Wirth, Tiefenbronn (DE); Michael Zuern, Sindelfingen (DE)

(73) Assignee: Daimler AG, Stuttgart (DE)

( * ) Notice: Subject to any disclaimer, the term of this patent is extended or adjusted under 35 U.S.C. 154(b) by 339 days.

(21) Appl. No.: 13/996,932

(22) PCT Filed: Oct. 28, 2011

(86) PCT No.: PCT/EP2011/005455
§ 371 (c)(1),
(2), (4) Date: Sep. 27, 2013

(87) PCT Pub. No.: WO2012/084087
PCT Pub. Date: Jun. 28, 2012

(65) Prior Publication Data
US 2014/0007432 A1    Jan. 9, 2014

(30) Foreign Application Priority Data

Dec. 23, 2010   (DE) .................. 10 2010 055 959

(51) Int. Cl.
*B62D 65/12* (2006.01)
*B23P 23/06* (2006.01)
*B62D 65/02* (2006.01)

(52) U.S. Cl.
CPC .............. *B62D 65/12* (2013.01); *B23P 23/06* (2013.01); *B62D 65/02* (2013.01); *Y10T 29/49622* (2015.01)

(58) Field of Classification Search
CPC ..... B23P 23/06; B23Q 7/1436; B62D 65/02; B62D 65/04; B62D 65/024; B62D 65/12; Y10T 29/49622; Y10T 29/5196
See application file for complete search history.

(56) References Cited

U.S. PATENT DOCUMENTS

| | | | |
|---|---|---|---|
| 3,968,559 A * | 7/1976 | Karlsson | ................ 29/430 |
| 4,033,033 A | 7/1977 | Heffner | |
| 4,257,158 A | 3/1981 | Casutt et al. | |
| 4,730,870 A * | 3/1988 | DeRees | ............. 296/193.04 |
| 4,738,022 A * | 4/1988 | Sakamoto et al. | ............ 29/712 |

(Continued)

FOREIGN PATENT DOCUMENTS

| | | |
|---|---|---|
| DE | 10 2004 038 487 A1 | 3/2006 |
| EP | 0 240 470 A1 | 10/1987 |

(Continued)

OTHER PUBLICATIONS

Japanese Office Action dated Jul. 15, 2014, including partial English translation (four (4) pages).

(Continued)

*Primary Examiner* — Alexander P Taousakis
(74) *Attorney, Agent, or Firm* — Crowell & Moring LLP

(57) ABSTRACT

A method for assembling motor vehicles, in particular personal motor vehicles having a self-supporting shell involves equipping the respective shell of the motor vehicle with a corresponding chassis and equipping the chassis with vehicle wheels at least before an end of a main assembly line has been reached.

5 Claims, 5 Drawing Sheets

(56) References Cited

U.S. PATENT DOCUMENTS

Figure 1:
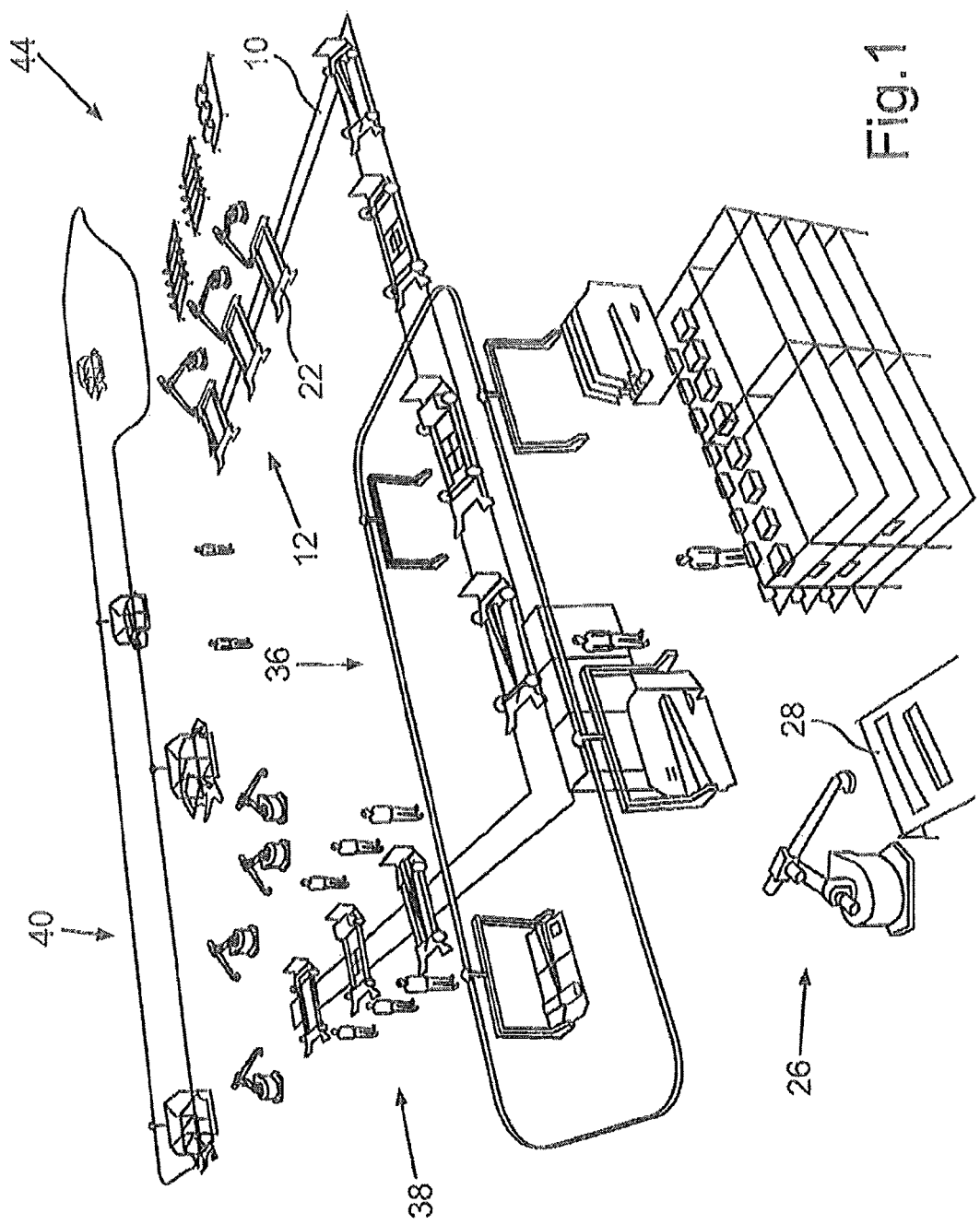

| | | | |
|---|---|---|---|
| 4,744,500 A * | 5/1988 | Hatakeyama et al. | 228/4.1 |
| 4,928,386 A * | 5/1990 | Schupp et al. | 29/824 |
| 4,951,802 A * | 8/1990 | Weissgerber et al. | 198/346.1 |
| 5,090,105 A | 2/1992 | DeRees | |
| 5,619,784 A * | 4/1997 | Nishimoto et al. | 29/430 |
| 6,226,848 B1 * | 5/2001 | Kurtz | 29/407.01 |
| 7,766,388 B1 | 8/2010 | Marino et al. | |
| 8,807,631 B2 * | 8/2014 | Grevener et al. | 296/181.1 |
| 2009/0230665 A1 | 9/2009 | Tamura et al. | |
| 2009/0234487 A1 * | 9/2009 | Kimura | 700/112 |
| 2011/0094855 A1 * | 4/2011 | Terazawa et al. | 198/464.1 |
| 2011/0154654 A1 * | 6/2011 | Cardani et al. | 29/795 |

FOREIGN PATENT DOCUMENTS

| | | |
|---|---|---|
| EP | 0 278 479 A2 | 8/1988 |
| EP | 1 454 817 A1 | 9/2004 |
| JP | 7-257452 A | 10/1995 |
| JP | 9-24870 A | 1/1997 |
| WO | WO 02/055364 A1 | 7/2002 |
| WO | WO 03/054500 A2 | 7/2003 |

OTHER PUBLICATIONS

International Search Report (PCT/ISA/210) dated May 9, 2012 w/ partial English translation (seven (7) pages).

German-language Written Opinion (PCT/ISA/237) dated May 9, 2012 (nine (9) pages).

\* cited by examiner

METHOD FOR FITTING MOTOR VEHICLE SUSPENSION SYSTEMS

BACKGROUND AND SUMMARY OF THE INVENTION

Exemplary embodiments of the present invention relate to a method for assembling motor vehicles.

It is commonly known from the series production of vehicles, in connection with the shell production and the subsequent coating of the respective shell bodies, to equip these with a respective interior installation in a main assembly line of the final assembly. Here, the bodies are guided through the main assembly line by means of corresponding conveyance and transportation technology. In this instance, the dashboard, the seating units, the central console, the pedals, the steering column and the interior trim, for example, are assembled as large modules. In parallel with the final assembly of the interior installation, a pre-assembly of the chassis and drive train typically takes place in the main assembly line, wherein these components are typically assembled and transported on a separate conveyance means. After the respective shell of the personal motor vehicle has been equipped with the interior installation in the main assembly line or final assembly, the so-called "marriage" now typically takes place, wherein the shell of the motor vehicle is connected to the corresponding chassis and drive train arranged on the separate conveyance means. It is only after it has passed through the main assembly line that the respective motor vehicle is equipped with vehicle wheels.

European Patent document EP 0 278 479 A2 discloses a modularly constructed personal motor vehicle, which consists of a front, central and rear module. These are completely pre-assembled along separate assembly lines. Here, the rear module has a rear frame with wheels pre-assembled thereon. This module is prefabricated and then connected to the other modules of a personal motor vehicle.

German Patent document DE 10 2004 038 487 A1 discloses a modularly constructed vehicle frame of a heavy goods vehicle. Diverse attachment parts are already pre-assembled on its front module. The configuration is such that it is completely pre-assembled and can then be connected to the main frame that supports the vehicle wheels. US Patent document 2009/0230665 A1 shows a similar concept with a frame-like front module with wheels pre-assembled thereon.

Furthermore, U.S. Pat. No. 4,257,158 discloses an assembly line for assembling buses in which a self-supporting undercarriage module in framework construction is connected to wheels that are pre-assembled thereon after the pre-assembly with a non-load-bearing construction of the bus.

PCT International Patent document WO 02/055364 A1 discloses a similar concept with a self-supporting undercarriage module and wheels assembled thereon for personal motor vehicles. European Patent document EP 0240 470 A1 discloses a highly similar undercarriage module.

European Patent document EP 1 454 817 A1 shows a vehicle with an auxiliary frame, which supports the engine and the suspension of the vehicle, which also contains the hubs for the front wheels, and which is connected to these parts together with the body.

Furthermore, PCT International Patent document WO 03/054500 A2 discloses a wheel module for a motor vehicle that is pre-assembled separately in its own assembly line and then fastened to the vehicle.

In turn, U.S. Pat. No. 5,090,105 discloses an assembly concept for a motor vehicle, wherein a non-load-bearing body superstructure is placed onto a self-supporting substructure, which already contains drive components and wheels.

Since the shell has to be guided through the main assembly line by means of corresponding conveyance and transportation technology for the equipment with the interior installation, and the chassis and the drive train have to be guided through their respective pre-assemblies, a considerable amount of expenditure for conveyance and transportation technology arises overall for the assembly of the motor vehicle. This entails not only high investment costs, but also a large space requirement in the assembly hangars. Furthermore, assembly with the existing conveyance and transportation technology is relatively inflexible.

Exemplary embodiments of the present invention are directed to a method for the assembly of motor vehicles of the type cited above, by means of which the expenditure for conveyance and transportation technology is considerably reduced.

In order to create a method of the type cited above, by means of which the expenditure for conveyance and transportation technology is considerably reduced in particular, provision is made according to the invention for the chassis to be equipped with vehicle wheels at least before one end of a main assembly line has been reached. Here, the motor vehicle is moved by external power or by its own drive after the chassis has been equipped with the vehicle wheels.

In other words, provision is thus made according to the invention for the motor vehicle to have vehicle wheels added to it at a far earlier point than has been typical to-date (which is typically after the main assembly line), in order to thus save at least one part of the conveyance and transportation technology, which is necessary for taking the weight of the motor vehicle and, if necessary, for moving the motor vehicle along. Since the motor vehicle can bear its own weight after the assembly of the vehicle wheels and at least roll, it is at least no longer necessary for the main assembly line to take the weight of the motor vehicle in the further procedure. This not only enables a considerable saving in conveyance and transportation technology with the consequential effects linked thereto, but a far more flexible assembly is also achieved. It is thus possible, for example, to carry out an offtake buffering of motor vehicles in a very flexible manner at an early point in time, and, if necessary, to store this temporarily before the further assembly is to take place. To that end, only one corresponding storage area is required.

In this case, the motor vehicle is alternatively moved by external power or even by its own drive after the vehicle wheels have been assembled. Here, externally powered is understood to mean that the motor vehicle is moved forwards with the aid of an external force—for example with the aid of a driverless transport system—but rolls on its own wheels. Thus, conveyance and transportation technology can at least be dispensed with, which must take a considerable part of the weight of the motor vehicle.

Alternatively, it is also possible for the motor vehicle to be moved by its own drive. For this, it is, however, necessary for the drive of the motor vehicle to already be made ready for operation. For an electric drive, the cabling to the battery of the vehicle and to the steering or to the respective control device must be produced. In an internal combustion engine, a driverless transport system is used for transportation through the main assembly line. An omission of connecting conveyance technology is also possible, such that a completely autonomous vehicle movement is provided.

A preferred embodiment here provides that the chassis is equipped with the vehicle wheels at least before the main assembly line, and indeed preferably in direct or quick conjunction with a connection of the chassis to the shell, which typically occurs in line with a so-called marriage. This preferably happens before the shell has the interior equipment added to it, such that the motor vehicle can preferably roll on its own wheels while the main assembly line is being entirely passed through, in which this has the interior installation added to it.

Finally, it has been shown to be advantageous if the movement of the motor vehicle onto the vehicle wheels takes place via a control device of the assembly line, in particular the main assembly line. Thus, the motor vehicle can be adjusted to the flow of the assembly line via external control signals.

BRIEF DESCRIPTION OF THE DRAWING FIGURES

Figure 2:
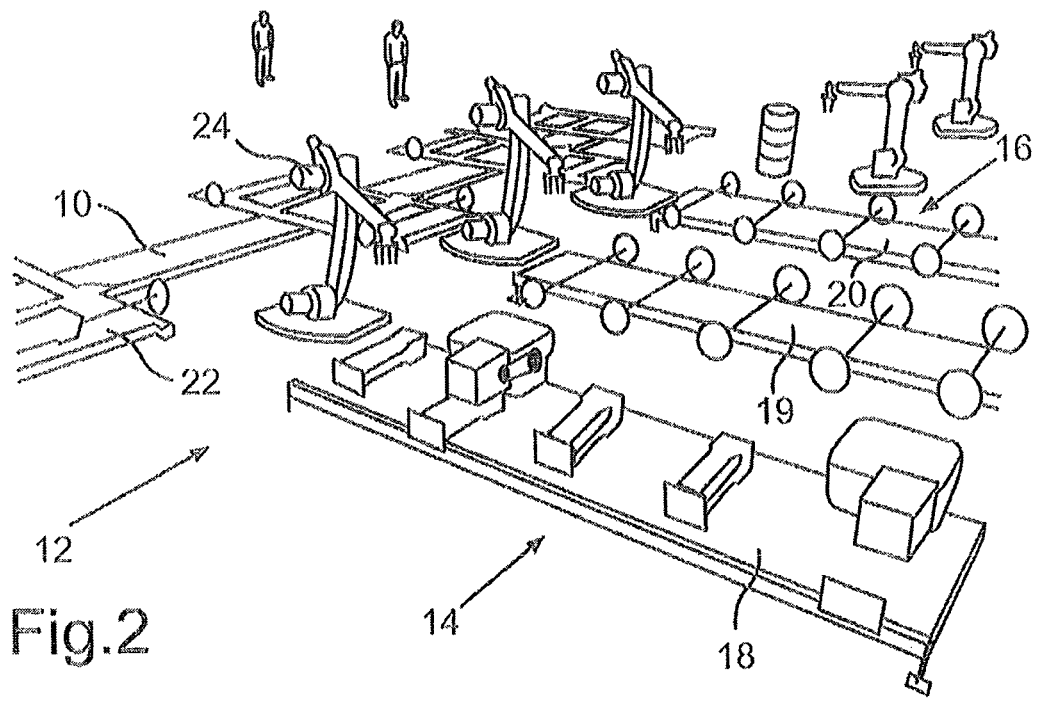
Figure 3:
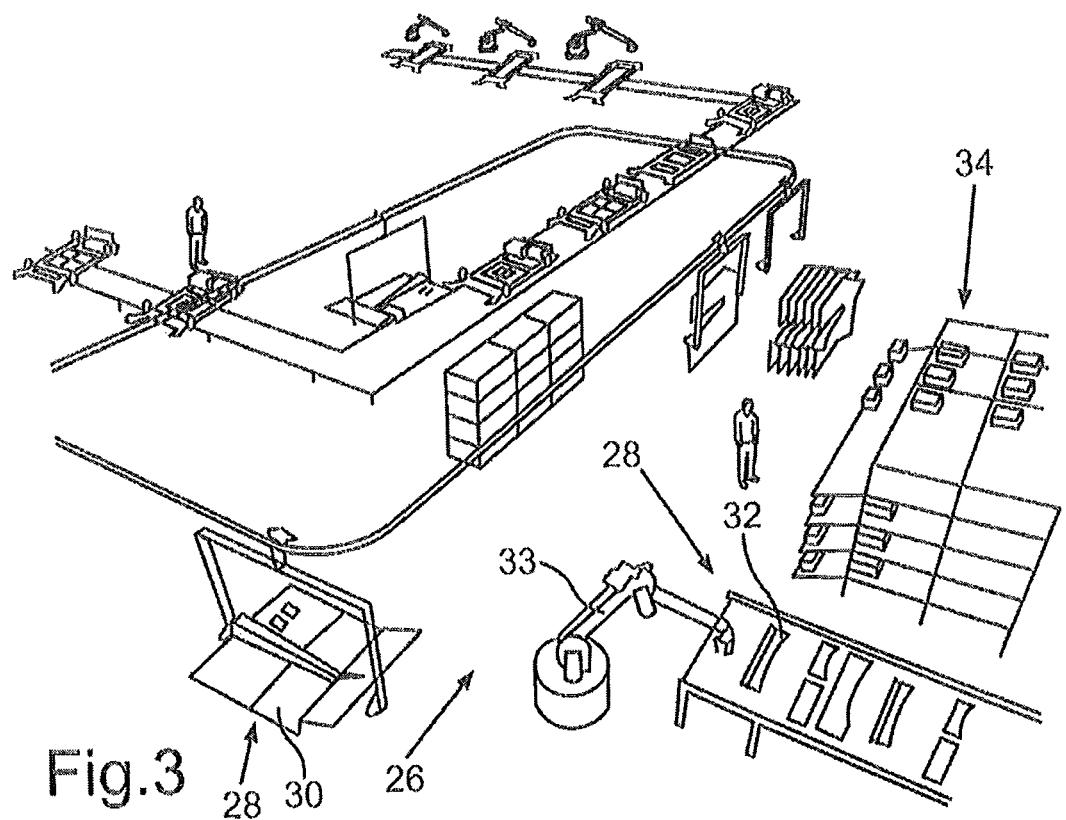
Figure 4:
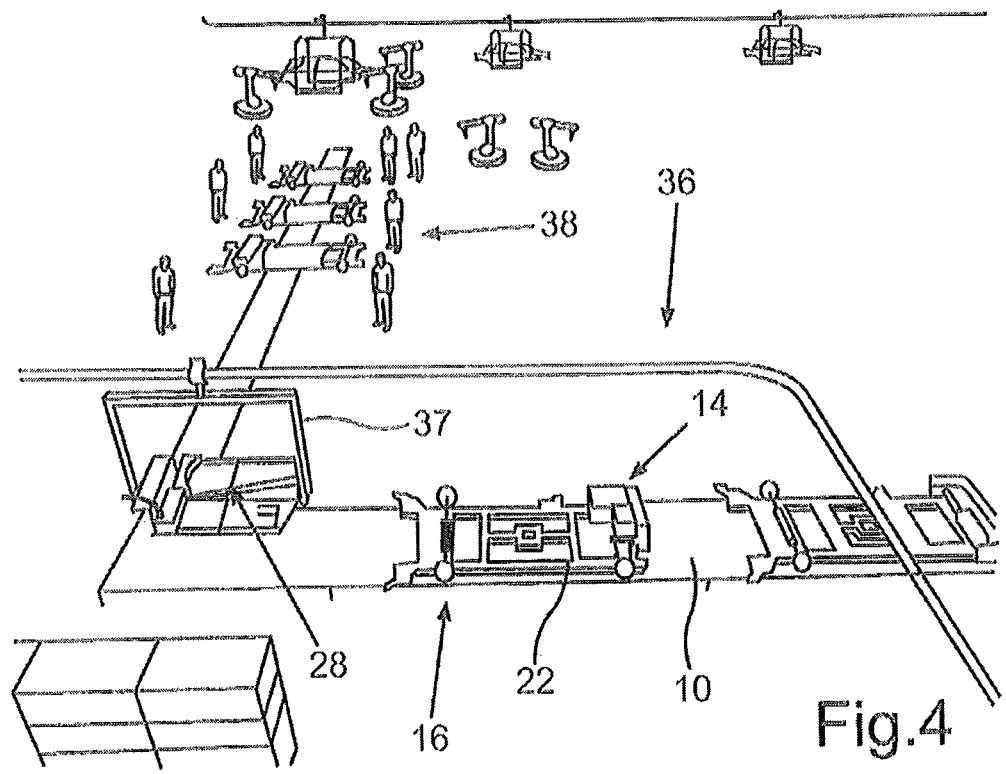
Figure 5:
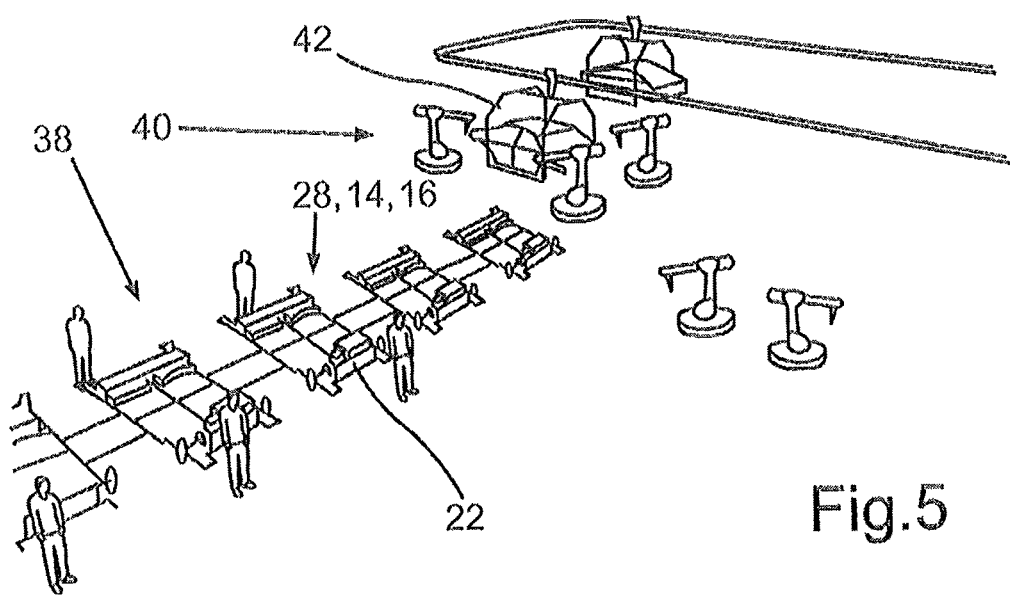
Figure 6:
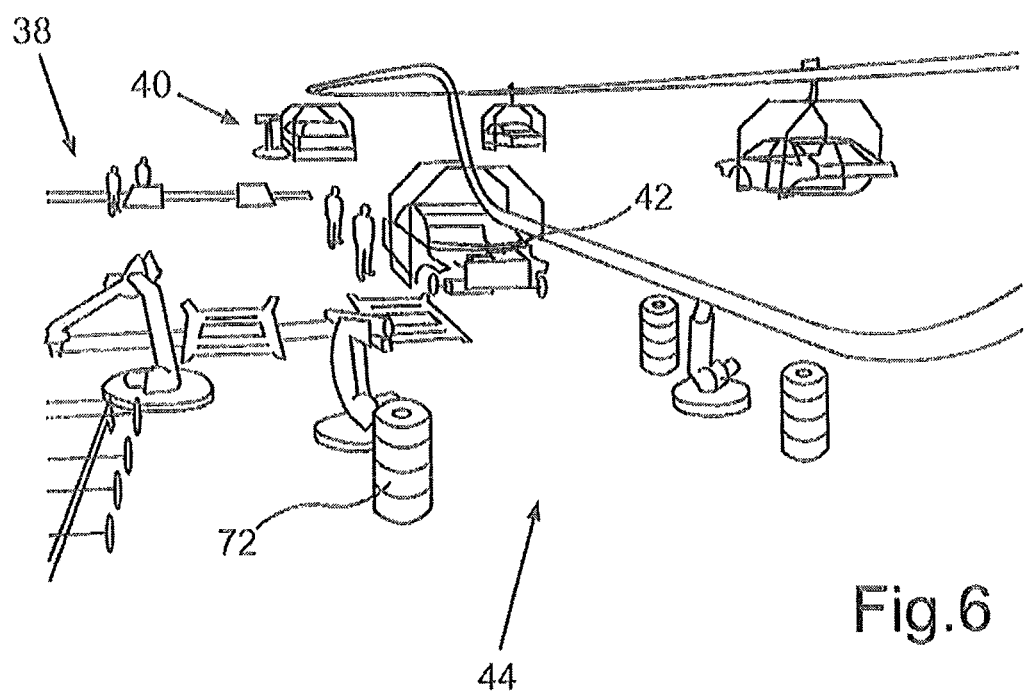
Figure 7:
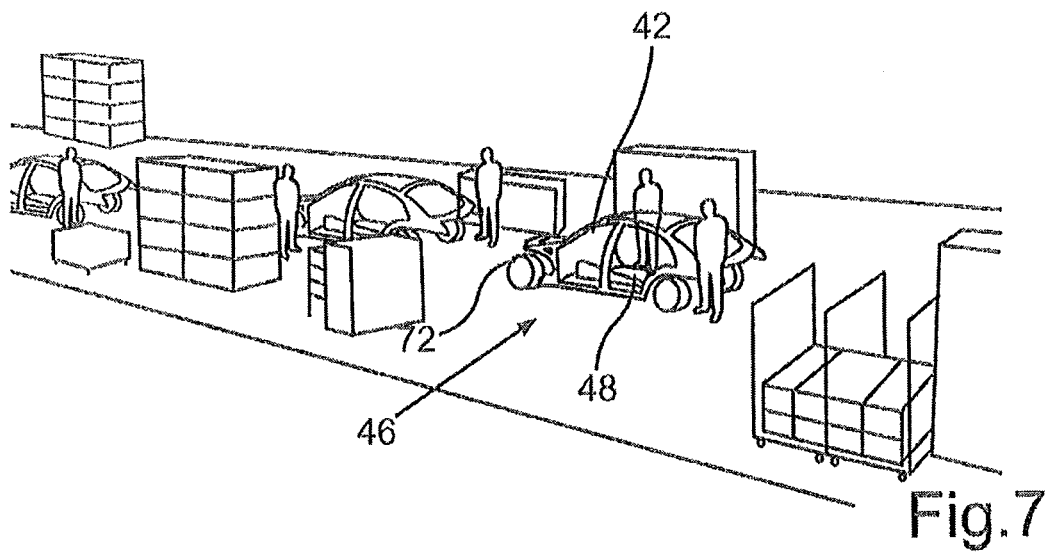
Figure 8:
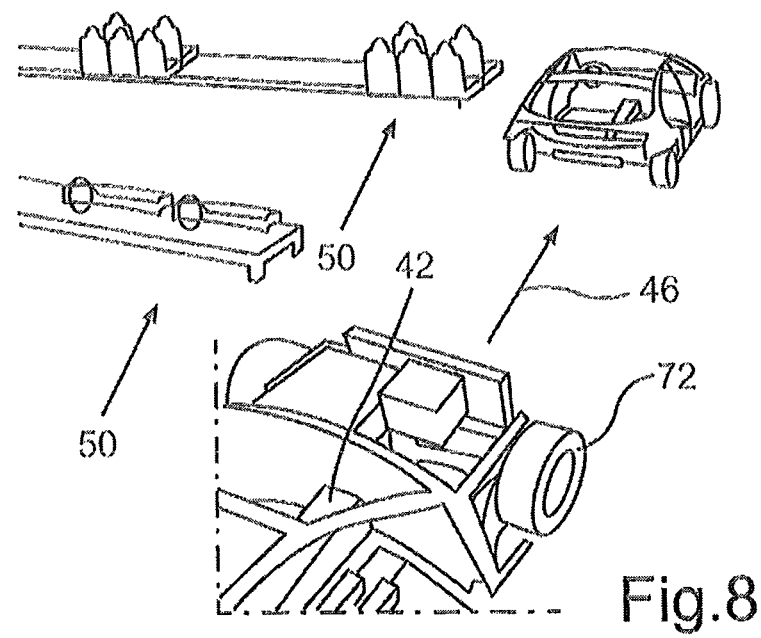
Figure 9:
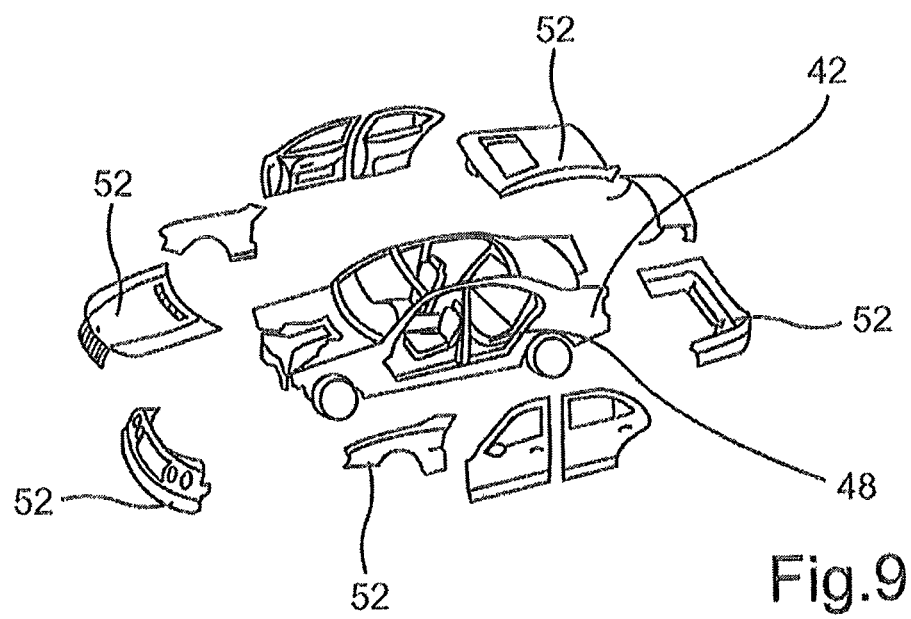

Further advantages, features and details of the invention arise from the following description of a preferred exemplary embodiment and by reference to the drawings; the following are shown:

FIG. 1 a schematic perspective view onto an assembly line for the pre-assembly of a respective chassis and a respective drive train of the corresponding motor vehicle, as well as a floor module of the respective motor vehicle, which are connected to one another in line with a so-called "engagement" and pre-assembled before these are connected to a respective corresponding shell of the corresponding motor vehicle in line with a so-called "marriage", wherein the motor vehicle is equipped with wheels after the marriage;

FIG. 2 a schematic perspective view onto the pre-assembly of the drive train and of the chassis within the assembly line shown in the FIG. 1;

FIG. 3 a schematic perspective view onto a pre-assembly of the floor module within the assembly line according to FIG. 1;

FIG. 4 a schematic perspective view onto the engagement of the chassis and the drive train with the respective floor module within the assembly line according to FIG. 1;

FIG. 5 a schematic perspective view onto the marriage of the respective shell of the motor vehicle with the respective chassis and drive train or the respective floor module within the assembly line according to FIG. 1;

FIG. 6 a schematic perspective view onto an assembly station of the assembly line according to FIG. 1 after the marriage, within which the motor vehicle is equipped with the vehicle wheels;

FIG. 7 a schematic perspective view onto assembly stations of a main assembly line located downstream of the assembly line according to FIG. 1, in which the respective shell of the motor vehicle is equipped with the interior installation;

FIG. 8 a further sectional perspective view onto respective assembly stations of the main assembly line, within which respective constructional units and components of the interior installation are provided for the assembly; and FIG. 9 a perspective view onto the respective shell of the motor vehicle, which has the chassis, drive train and interior installation added to it, which, in connection to the interior installation, has the elements forming the outer skin added to it.

DETAILED DESCRIPTION

FIG. 1 depicts, in a schematic perspective view, an assembly line arranged upstream of a main assembly line (to be illustrated in greater detail) for the assembly of motor vehicles. This assembly line 10 is to be furthermore illustrated in detail in conjunction with FIGS. 2 to 6.

First, in conjunction with FIG. 2, a first region 12 of the assembly line 10 can be seen, which shows the pre-assembly of a respective drive train 14 and a respective chassis 16 of the corresponding motor vehicle. Here, FIG. 2 shows the region 12 in a schematic and sectional perspective view.

As can be seen from FIG. 2, the region 12 of the assembly line 10 comprises a supply device 18 for a respective different drive or drive train 14, which is provided depending on the respective drive concept of the motor vehicle. Respective supply devices 19, 20 for a front axle or rear axle of the respective chassis 16 can be seen behind the supply device 18 for the respective drive or drive train 14. Moreover, further chassis elements or components can be provided as well as the front and rear axle.

As can now be seen from FIG. 2, the individual components of the drive train 14 and the chassis 16 are arranged on a respective auxiliary carrier 22, which is conveyed on the assembly line 10. This takes place by means of corresponding robots 24.

The respective components of the drive train 14 and the chassis 16 are provided in sequence on the supply devices 18 to 20 and positioned on the respective auxiliary carrier 22, which is allocated to a motor vehicle that is to be produced accordingly. The sequential arrangement and selection of the individual components of the drive train 14 and the chassis 16 thus take place depending on a respective drive concept of the motor vehicle.

In conjunction with FIG. 3, which in particular shows a second region 26 of the assembly line 10 in a further sectional and schematic perspective view, the pre-assembly of a floor module 28 becomes clear. This floor module 28 comprises a floor shell 30, on which a plurality of constructional units 32 can be arranged as equipment. These constructional units 32 are variant-specific or variant-dependent on the respective drive concept of the corresponding motor vehicle. Here, both individual components and constructional elements can be understood to be constructional units, as well as assemblies or structural groups. It is conceivable, for example, to also add heat shields, hydraulic lines or fuel lines to the floor shell 30, as well as air lines or the like. It is also conceivable to add a corresponding drive-concept-conditional energy storage device, for example a tank, a battery or suchlike, to the floor shell 30. Corresponding control devices, which are required depending on the corresponding drive concept of the motor vehicle, can also be applied to the floor shell 30. Electrical constructional units 32, such as cable harnesses, in particular the main cable harness, can also be fastened to the floor shell 30 in order to hereby complete the floor module 28.

The individual constructional units 32 are hereby applied to the floor shell 30 by means of a robot 33, for example. In the present case, a shelf 34 is depicted, on which the constructional units 32, for example, are provided in sequence.

In conjunction with FIG. 4, a third region 36 of the assembly line 10 is depicted in a sectional and schematic perspective view. In this third region, there takes place a so-called engagement of the drive train 14 or chassis 16 pre-assembled in the first region 12 and the floor module 28 pre-assembled in the second region 26. Here, it can be seen that the auxiliary carrier 22 bearing the drive train 14 and the chassis 16 is introduced from below and the floor module 28 is fitted from above on the upper side via a corresponding transportation device 37. Thus, due to the engagement, there arises a pre-assembled arrangement of drive train 14, chassis 16 and floor module 28, which is attuned to the respective variant of the motor vehicle or to the respective drive concept of the motor vehicle.

Moreover, in FIG. 4, further assembly stations 38 can be seen, within which, for example, a connection of the corresponding components and constructional units 32 of the drive train 14, the chassis 16 and the floor module 28 can take place. As well as the connection of the individual components and constructional units 32, lines or energy storages devices such as tanks, for example, can be filled. Moreover, electrical control devices, for example, can be activated. After the engagement, the individual components or constructional units 32 are thus preferably ready for operation.

A fourth region 40 of the assembly line 10 can be seen in FIG. 5, in which a respective shell 42, in line with a so-called marriage with its respective drive train 14, chassis 16 and floor module 28, which have first been combined with one another in the third region 36 in line with the engagement, is connected. To that end, the shell 42 has a corresponding recess for the floor module 28, which is applied accordingly. The drive train 14 and the chassis 16, as well as the floor module 28, are also connected to the shell 42 of the motor vehicle. After the connection to the shell 42, the auxiliary carrier 22, which has served to bear the drive train 14, the chassis 16 and the floor module 28, is conveyed back to the first region 12. At this point, it is to be noted that the present shell 42 is a self-supporting body of a personal motor vehicle or a self-supporting structure of a motor vehicle in general.

Since, as has already been illustrated, the respective variant of the drive concept takes place by the corresponding formation of the drive train 14, the chassis 16 and the floor module 28, the shell 42 is substantially configured without variants. This means that the variation that is necessary based on the drive concept is at least substantially pre-displaced into the pre-assembly of the drive train 14, the chassis 16 and the floor module 28.

In FIG. 6, a further assembly station 44 of the assembly line 10 is shown in direct connection to the marriage, in which the chassis 16 of the motor vehicle has vehicle wheels 72 added to it. It is thus achieved, directly or in close connection to the marriage between the drive train 14 and the chassis 16 with the shell 42, that the weight of the motor vehicle no longer has to be taken by conveyance and transportation devices. In fact, the motor vehicle can now roll on its own vehicle wheels 72.

FIGS. 7 and 8 show respective perspective views of a main assembly line 46, which is connected to the assembly line 10. It can be seen that the respective motor vehicles stand on its own vehicle wheels 72 for this. By contrast to the conventional existing assembly method, the equipping of the shell 42 with an interior installation 48 first takes place after the marriage. This interior installation 48 in particular comprises the installation of the dashboard, the seating units, the interior trim, the central console and a plurality of further devices such as the pedals, the steering column or other further equipment. For this, FIG. 8 shows respective assembly stations 50, wherein, for example, corresponding seating units or dashboards are assembled. Moreover, FIG. 7 shows that, for example, the displacement of the shell 42 can take place in the main assembly line 46.

Finally, FIG. 9 shows the shell 42 of the motor vehicle in a schematic perspective view, wherein the interior installation 48 has already been implemented. It can be seen that, as well as the interior installation 48, the front windscreen and rear windscreen have also been adjusted.

In a further method procedure within the main assembly line 46, the shell 42 of the motor vehicle has a plurality elements 52 added to it after the interior installation 48 has been equipped, which form the outer skin of the motor vehicle. These elements can be not only moveable doors or hoods or flap, but also other external covering parts such as mud guards, roof modules, front- and rear-end modules or other external attachment parts. Here, the motor vehicle is preferably designed in such a way that the entire shell 42 is covered with corresponding external covering elements 52. This has the advantage that the shell 42 only has to have corrosion protection added to it before it is delivered to the marriage, and not a coating. This can be saved, since all regions are non-visible parts and are covered by the external covering elements 52.

The adjustment of functional elements of the motor vehicle can be preferably take place within the main assembly line 46, and therefore in particular to reduce the volumes in the region of the end of the main assembly line 46. Thus, for example, a chassis adjustment, a headlight adjustment or a calibration and start operation of driver assistance systems, in particular chassis assistance systems, can be displaced from the main assembly line 44 to the pre-assembly. Thus, for example, corresponding adjustments of functional elements in connection with the engagement and before or after the marriage can be monitored in the region of the pre-assembly and before the main assembly line 46. Likewise, due to the possibility for autonomous movement of the motor vehicle, it is possible for this to be moved onto corresponding chassis dynamometers or into regions for rain testing.

Overall, it can thus be seen that the individual motor vehicles can be moved autonomously after the assembly of the vehicle wheels 72 insofar as its vehicle weight no longer has to be taken by external transportation and conveyance devices, Since the respective motor vehicle is already equipped with the vehicle wheels 72 after the end of the marriage between the chassis 16 and the shell 42, this can be moved on its own vehicle wheels 72 along the complete main assembly line 46 or during the assembly of the interior installation 48 that is at least virtually complete.

Here it is, in principle, possible for the systems of the vehicle to already be activated to such an extent that an independent acceleration, deceleration or steering of the motor vehicle is possible. As an alternative to this, it would also be possible, however, to use conveyance and transportation systems insofar as these serve to provide an external drive force for the movement of the respective motor vehicle. Thus, it would also be possible, for example, to move the motor vehicles on their own vehicle wheels 72 with the aid of a driverless transport system.

The movement of the motor vehicle onto the vehicle wheels 72 thus takes place, for example, via a control device, wherein, as well as control signals, electrical power can also be provided, if necessary.

In this instance, the taking of the motor vehicle weight for the respective vehicle wheels 72 thereof results in not only a saving of conveyance and transportation technology, but furthermore the assembly can also be configured more flexibly on the whole. For example, it is conceivable to buffer individual motor vehicles and thus enable a more flexible assembly. For this, only one corresponding space for accommodating the vehicles is necessary.

By moving the motor vehicle onto its vehicle wheels, it is furthermore very easily possible to transfer a motor vehicle out of installation. This can take place, for example, by remote control via a hand-held operating device.

Furthermore, due to the movement of the motor vehicle onto the vehicle wheels 72, it is very easily possible to bring the vehicle into a raised position, such that assembly operations can be carried out in the lower region of the vehicle, for example on the undercarriage. To that end, only one ramp or similar is provided in the assembly line, onto which the motor vehicles can be moved automatically without a cost-intensive lifting device having to be provided as part of the conveyance technology for lifting the body. Alternatively, it is very easily possible to move individual vehicles over a pit in order to carry out assembly operations on the undercarriage. The human engineering for the operator is considerably improved by both of these easy-to-implement measures.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for the assembly of a motor vehicle having a self-supporting shell, the method comprising:
   equipping the self-supporting shell of the motor vehicle with a chassis;
   equipping the chassis with vehicle wheels at least before an end of a main assembly line has been reached; and
   moving the motor vehicle by the motor vehicle's own drive after the chassis has been equipped with the vehicle wheels and before the end of the main assembly line has been reached such that the motor vehicle rolls on the vehicle wheels and the vehicle wheels bear a weight of the motor vehicle, such that the motor vehicle moves completely autonomously without external transportation and connecting conveyance devices of the main assembly line, and such that the motor vehicle is accelerated, decelerated, and steered independently of the main assembly line.

2. The method according to claim 1, wherein the chassis is equipped with the vehicle wheels at least before the main assembly line.

3. The method according to claim 2, wherein the chassis is equipped with the vehicle wheels after the chassis has been arranged on the self-supporting shell of the motor vehicle.

4. The method according to claim 1, wherein the vehicle wheels are added to the chassis before the self-supporting shell of the motor vehicle is equipped with an interior installation.

5. The method according to claim 1, wherein the movement of the motor vehicle onto the vehicle wheels takes place via a control device of the main assembly line.

\* \* \* \* \*